United States Patent [19]

Taggart et al.

[11] Patent Number: 5,266,274
[45] Date of Patent: Nov. 30, 1993

[54] OXYGEN CONTROL SYSTEM FOR A SULFUR RECOVERY UNIT

[75] Inventors: George W. Taggart, Dallas; James E. Lewis, Plano, both of Tex.

[73] Assignee: TPA, Inc., Dallas, Tex.

[21] Appl. No.: 959,443

[22] Filed: Oct. 13, 1992

[51] Int. Cl.$^5$ ............................................. G05D 16/00
[52] U.S. Cl. ..................... 422/112; 422/110; 422/111; 422/168; 422/182; 423/574.1
[58] Field of Search .............. 422/168, 182, 106–111; 423/574 R

[56] References Cited

U.S. PATENT DOCUMENTS

| | | | |
|---|---|---|---|
| Re. 28,864 | 6/1976 | Andral et al. | 422/111 |
| 3,752,877 | 8/1973 | Beavon | 423/564 |
| 3,963,443 | 6/1976 | Bond et al. | 422/189 |
| 4,038,036 | 7/1977 | Beavon | 422/189 |
| 4,051,231 | 9/1977 | Bond et al. | 423/659 |
| 4,069,020 | 1/1978 | Bond et al. | 423/659 |
| 4,123,220 | 10/1978 | Bond et al. | 431/353 |
| 4,210,627 | 7/1980 | Verloop et al. | 422/111 |
| 4,390,515 | 6/1983 | Vincent | 422/110 |
| 4,391,790 | 7/1983 | Palm et al. | 422/178 |
| 4,438,069 | 3/1984 | Peterman et al. | 422/111 |
| 4,643,888 | 2/1987 | Palm | 423/574 R |
| 4,780,305 | 10/1988 | Steppe | 423/574 R |
| 4,818,740 | 4/1989 | Berben et al. | 423/576 |
| 4,842,843 | 6/1989 | Pendergraft | 423/574 R |
| 4,919,912 | 4/1990 | Taggart et al. | 423/574 R |
| 4,978,512 | 12/1990 | Dillon | 423/226 |
| 4,988,494 | 1/1991 | Lagas et al. | 423/574 R |

FOREIGN PATENT DOCUMENTS

1356289 7/1970 Netherlands .
1407778 2/1974 Netherlands .

Primary Examiner—Robert J. Warden
Assistant Examiner—Hien Tran
Attorney, Agent, or Firm—Gregory W. Carr

[57] ABSTRACT

An apparatus for controlling oxygen flow to a Claus type sulfur recovery unit includes system for measuring the flow(s) of feed gas and combustion air to the unit and an oxygen injection system for supplying supplemental oxygen when the oxygen demand exceeds the oxygen available in the form of combustion air. The control system also measures a unit pressure in the sulfur recovery unit and controls the flow of combustion air to the unit to maintain the unit pressure at or below a preselected level.

22 Claims, 6 Drawing Sheets

OXYGEN CONTROL SYSTEM FOR A SULFUR RECOVERY UNIT

TECHNICAL FIELD

This invention relates to the use and control of oxygen in sulfur recovery units and in particular to a system for controlling the amount of oxygen supplied to a Claus type sulfur recover unit to oxidize acid gas.

BACKGROUND OF THE INVENTION

Sulfur is produced commercially by two techniques: the Frasch process, which involves melting underground deposits of sulfur with superheated water and forcing the molten sulfur to the surface with compressed air, and the Claus process, which takes advantage of the reactivity of sulfur dioxide and hydrogen sulfide to produce elemental sulfur by bringing these two agents together in nearly stoichiometric proportions of two parts hydrogen sulfide to one part sulfur dioxide. Recovery of elemental sulfur from sulfur containing gas streams by the Claus process is a widely practiced procedure wherein elemental sulfur is produced by the well known Claus reaction as follows:

$$2H_2S + SO_2 \rightleftharpoons 2H_2O + 3S \qquad \text{REACTION A}$$

Under normal circumstances, the feed gas (acid gas) to the Claus process contains a substantial portion of hydrogen sulfide which is partially oxidized to produce sulfur dioxide in an amount approximately satisfying the stoichiometric relationship indicated by REACTION A. Thus, sufficient oxygen is supplied to the hydrogen sulfide containing stream in a combustion zone to oxidize about ⅓ of the hydrogen sulfide to sulfur dioxide via the following reaction: $2H_2S + 3O_2 \rightarrow 2H_2O + 2SO_2$. Alternatively, approximately ⅓ or more of the acid gas stream is diverted to a combustion zone where oxidation of the hydrogen sulfide is carried out in the presence of an amount of oxygen adequate to provide the required amount of sulfur dioxide. The remaining portion of the acid gas stream is not treated so that when the split portions of the gas stream are recombined, the combined gas stream contains hydrogen sulfide and sulfur dioxide in the approximate stoichiometric ratio.

As indicated by REACTION A, three moles of oxygen are required to combust two moles of hydrogen sulfide to water and sulfur dioxide. The sulfur dioxide then reacts with the remaining hydrogen sulfide in one or more reactor(s) or reaction zone(s) over a catalyst such as bauxite or alumina at elevated temperatures to produce elemental sulfur and water vapor. Additionally, during combustion of the hydrogen sulfide, a portion of the hydrogen sulfide in the feed gas dissociates to free hydrogen and elemental sulfur, $H_2S + \text{heat} \rightarrow H_2 + S$ via thermal decomposition. Any residual hydrocarbons present in the gas stream are oxidized to form carbon monoxide and water vapor which are inert in the Claus reactor.

Oxygen is normally supplied to a Claus unit as pressurized combustion air which typically contains about 21 mole % oxygen and 79 mole % nitrogen on a dry basis. Thus, for every mole of oxygen used to combust hydrogen sulfide approximately 4 moles of nitrogen are introduced in the gas stream. Although nitrogen is inert under typical Claus reaction conditions, the nitrogen contained in the combustion air represents a significant portion of the hydraulic loading of a Claus type sulfur recovery unit.

The amount of oxygen supplied to a Claus type sulfur recovery unit must be controlled to compensate for variability in the volume and composition of the acid gas feed stream(s) to the unit in order to maintain the desired stoichiometric ratio of two moles of hydrogen sulfide per mole of sulfur dioxide in the gas stream entering the reaction zone. The total gas flow through a sulfur recovery unit is, however, limited by the hydraulic capacity of the system. Moreover, from a design standpoint is it not necessarily desirable to design a sulfur recovery unit capable of combusting, with air, the peak volume of acid gas that must be processed due to increased equipment cost and capital expenditure. Additionally, in the case of existing plants, the hydraulic limitations of a sulfur recovery unit may be exceeded if acid gas production is increased due to changes in the process or feedstock. Thus, there exists a need for a method and apparatus that will provide the stoichiometrically required oxygen to a Claus type sulfur recovery unit while simultaneously maintaining gas flows within the hydraulic limits of the unit.

Taggart et al., U.S. Pat. No. 4,919,912, discloses a process for treating sulfur containing gas streams using the Claus reaction in which a recycled stream containing a reactive component is employed in a negative feedback mode to maintain the sulfur producing Claus reaction at approximately equilibrium conditions. The feedstream may contain hydrogen sulfide or sulfur dioxide in a minor amount in an inert gas background. The feedstream to the reaction zone contains a stoichiometrically excess amount of sulfur dioxide for the Claus reaction. Effluent from the reaction zone is passed to a hydrogenation zone where the sulfur dioxide is converted to hydrogen sulfide. Hydrogen sulfide is extracted from the hydrogenation zone effluent and recycled to the Claus reaction zone.

Bond et al., U.S. Pat. No. 3,963,443, discloses a gas mixer and reactor and processes utilizing the mixer and, in particular, a process for converting sulfur containing gas into elemental sulfur.

Bond et al., U.S. Pat. No. 4,051,231, discloses a gas mixer and reactor which includes an elongated gas flow chamber with a nozzle arrangement at its inlet. Atmospheres for kilns having controlled amounts of free hydrogen, carbon monoxide, oxygen, or carbon, for example, are produced by burning controlled ratios of fuel, air, and in some cases an inert gas mixed by the reactor.

Bond et al., U.S. Pat. No. 4,069,020, discloses a process for the production of reducing gases and an apparatus for use therein. A unique gas mixer and reactor is provided which can be used to effect substoichiometric reactions of gaseous reactants to produce a hydrogen-rich gas. The gases which are to be reduced are then admixed with the hydrogen-rich gas, and the gaseous mixture is passed to a catalytic reactor where the reduction reaction takes place.

Bond, et al., U.S. Pat. No. 4,123,220, discloses a gas mixer and reactor which is especially suitable as a burner.

The foregoing references, the disclosures of which are incorporated herein by reference for all purposes, do not, however, address the need for a control system for a Claus type sulfur recovery unit which uses oxygen to control the hydraulic loading of the unit.

SUMMARY OF THE INVENTION

The present invention provides an apparatus for controlling oxygen flow to a Claus type sulfur recovery unit including apparatus for measuring the flow rate of feed stream(s) and a control system for supplying supplemental oxygen to the system when the oxygen demand exceeds the oxygen supplied in the available combustion air. The control system also measures a unit pressure in the sulfur recovery unit and controls the flow of combustion air to maintain the unit pressure at or below a preselected level.

DETAILED DESCRIPTION

Figure 1:
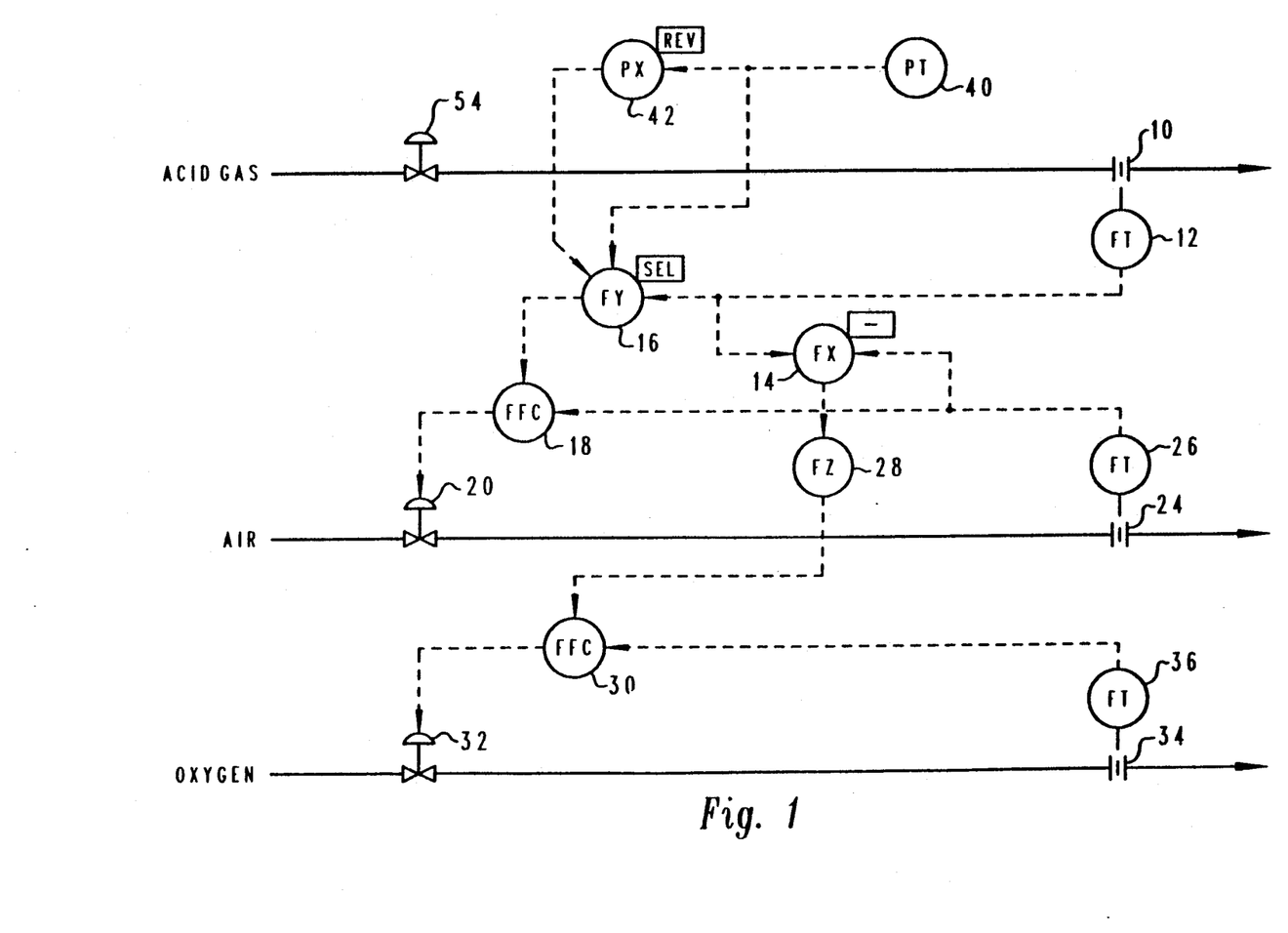
FIG. 1 is a schematic illustration of a control system of the present invention for controlling oxygen flow to a sulfur recovery unit.

Referring now to the drawings where like reference characters designate like or similar parts throughout, and specifically to FIG. 1, the control system of the present invention is schematically illustrated. An acid gas flow rate to a Claus type sulfur recovery unit is measured with flow meter 10. The acid gas flow rate is sent, via flow transmitter 12 to a subtracting relay 14 and a selector relay 16. The acid gas flow rate is interpreted, based on the composition of the acid gas, as oxygen required by the process and serves as a set point signal for the oxygen demand of the process. The output signal from the selector relay 16 becomes the set point for ratio controller 18 which drives control valve 20, supplying combustion air to the process.

The flow of combustion air is measured with flow meter 24 and the air flow rate is transmitted to ratio controller 18 and subtracting relay 14 via flow transmitter 26. The flow rate of the combustion air is interpreted as oxygen supplied to the process in the form of combustion air. The subtracting relay 14 produces an output signal proportional to the difference between the oxygen required and the oxygen supplied in the form of combustion air which is transmitted to an inverse derivative dampening device 28 which dampens variations due to "noise" in the control system. Dampening device 28 generates an output signal which becomes the set point for ratio controller 30 which drives control valve 32 to supply supplemental oxygen to the system on an as needed basis. Oxygen flow to the process is measured with flow meter 34 and a flow transmitter 36 transmits the oxygen flow rate to ratio controller 30 for conventional feedback control.

In order to control the hydraulic loading on the sulfur recovery unit, system pressure is measured at an appropriate location and a pressure transmitter 40 generates an output signal which is transmitted to selector relay 16 and a signal reversing device 42. At a predetermined pressure the selector relay 16 switches from a flow control mode to a pressure control mode by changing the set point signal from the oxygen required signal generated by flow transmitter 12 to an inverted pressure signal generated by signal reversing device 42. The pressure signal from signal reversing device 42 is characterized as inverted in that it is reverse acting in the conventional instrumentation manner.

The embodiment of the invention illustrated in FIG. 1 controls oxygen flow to the system and hydraulic loading of the system. As acid gas flow increases, increasing the amount of oxygen required, the combustion air ratio controller 18 drives control valve 20 to supply additional combustion air to the process. The difference between oxygen required and oxygen supplied will remain zero so long as the supply of combustion air is adequate to meet the oxygen requirement of the process. If the oxygen requirement of the process exceeds the amount of oxygen that can be supplied as combustion air, subtracting relay 14 transmits a positive signal to ratio controller 30 which, in turn, drives control valve 32 open to inject supplemental oxygen into the system. Thus, the oxygen injection system is activated only if the oxygen requirement of the process exceeds the capacity of the system to provide oxygen in the form of combustion air.

The hydraulic loading of the sulfur recovery unit is reflected by the system pressure. When the system pressure exceeds a predetermined level, selector relay 16 switches the set point signal from the oxygen required signal generated by flow transmitter 12 to an inverted pressure signal generated by signal reversing device 42. As the system pressure increases, the inverted pressure signal from signal reversing device 42 decreases, lowering the set point of ratio controller 18 which, in turn, tends to drive control valve 20 closed to decrease the amount of combustion air supplied to the system. The resulting decrease in combustion air flow creates a differential between the oxygen supplied and the oxygen required causing subtracting relay 14 to generate a positive signal received by ratio controller 30 which drives control valve 32 open to inject supplemental oxygen into the system. Thus, the system is maintained at the maximum allowable pressure while simultaneously using a minimum amount of oxygen.

When the acid gas flow rate to the unit decreases to a level where the system pressure drops below a predetermined level, selector relay 16 switches the set point from the inverted pressure signal generated by signal reversing device 42 to the oxygen required signal generated by flow transmitter 12. Assuming that the combustion air supply is sufficient to meet the oxygen requirement to the system, there will be no differential between oxygen required and oxygen supplied and ratio controller 30 will drive flow control valve 32 to the closed position. Preferably, selector relay 16 is set to switch at a higher pressure on rising pressure than on falling pressure in order to avoid system instabilities in which the selector relay 16 is alternatively switching from one mode to another.

Figure 2:
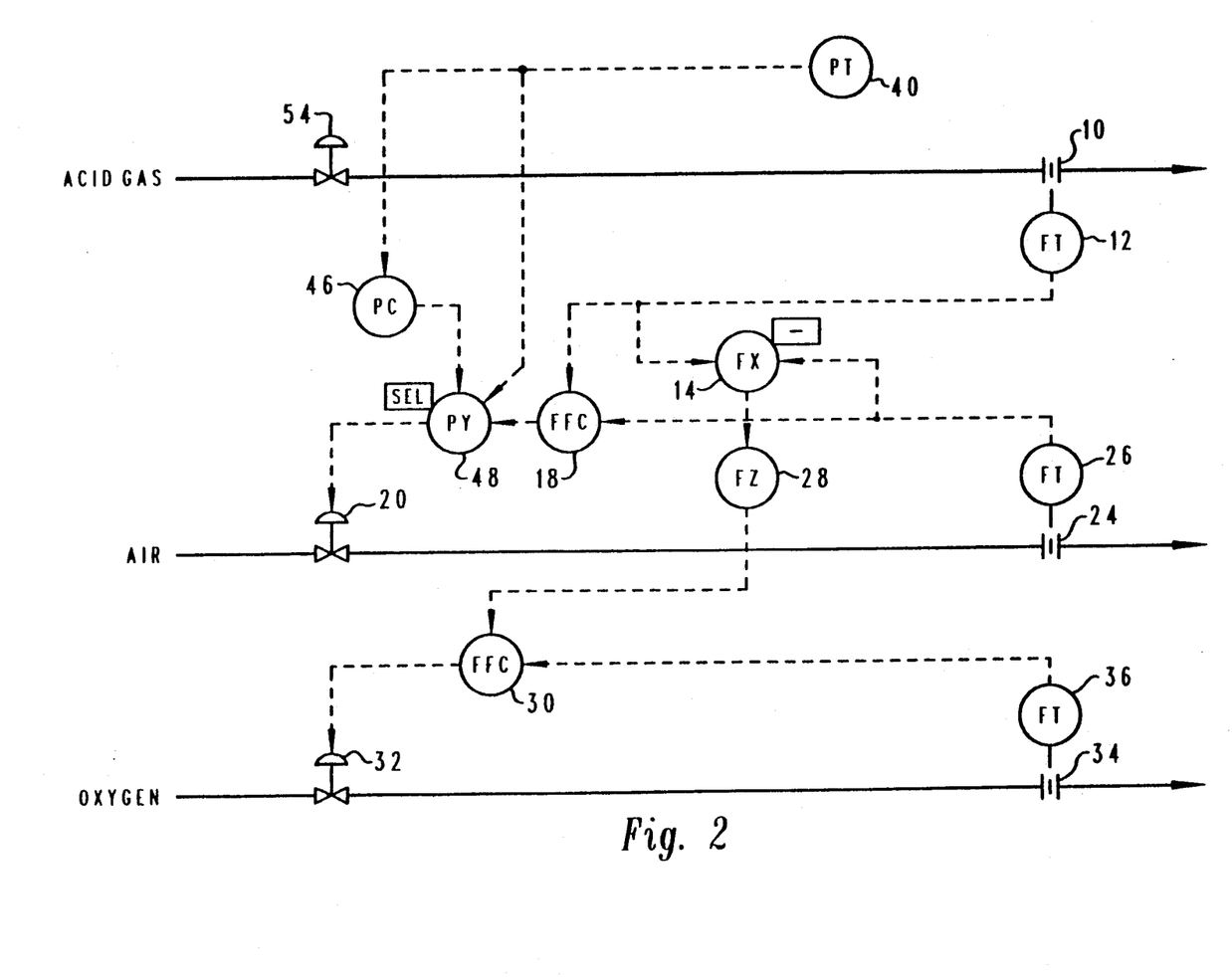
FIG. 2 is a schematic illustration of an alternate embodiment of the control system of the present invention including a modified pressure control loop.

FIG. 2 illustrates an alternative embodiment of the control system of the present invention in which the signal from pressure transmitter 40 is sent to a controller 46 and a selector relay 48. So long as the system is operating at less than a predetermined pressure, selector relay 48 is switched to allow the output from ratio controller 18, which is driven by oxygen demand, to operate control valve 20. If the system pressure exceeds the predetermined pressure, selector relay 48 switches so that the output of ratio controller 46, which is inversely proportional to system pressure, operates control valve 20. Thus, when the system pressure exceeds a predetermined level, air flow to the system is reduced and the oxygen injection system compensates for any differential between oxygen required and oxygen supplied via combustion air.

Figure 3:
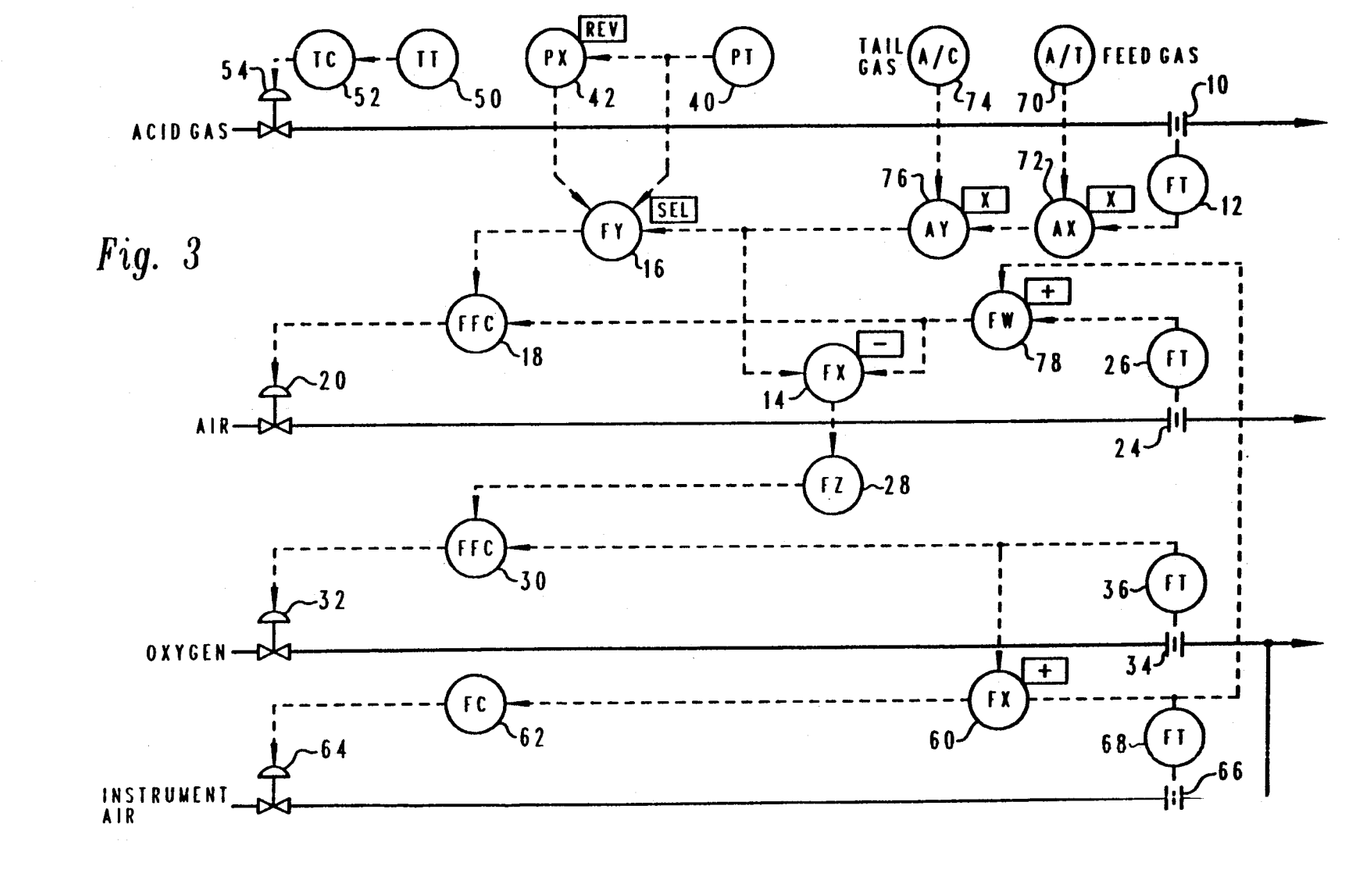
FIG. 3 is a schematic illustration of the control system of the present invention that includes a purge system for the oxygen injection system.

FIG. 3 illustrates an embodiment of the invention which includes an instrument air or nitrogen purge, temperature limiting controls and means for correcting the oxygen requirement based feed gas analysis and/or tail gas analysis. A major concern in the operation of a Claus sulfur recovery unit is excessive temperature(s) in the reaction zone(s) which can damage the process equipment. The embodiment of the invention illustrated in FIG. 3 provides a temperature monitor (not shown), and a controller 52. When the measured temperature exceeds a predetermined level controller 52 operates control valve 54 to reduce the acid gas flow to the sulfur recovery unit. Assuming that oxygen is being supplied to supplement combustion air, reducing the acid gas flow will reduce the oxygen requirement and consequently reduce or stop the oxygen flow to the unit. Reducing or stopping the oxygen flow will increase the amount of combustion air supplied to the unit relative to the acid gas flow thereby reducing the temperature of the gas stream exiting the combustion zone.

Depending upon the particular application, it may be desirable to correct the apparent oxygen based on the feed gas or tail gas composition. Typically, tail gas analyzer control is based upon measurement and comparison of the concentrations of hydrogen sulfide and sulfur dioxide in the tail gas. Feed gas analyzer control is typically based upon the concentration of hydrogen sulfide in the feed gas, but may take into account the concentrations of other components such as ammonia and hydrocarbons.

As illustrated, tail gas analyzer controller 74 and feed gas analyzer controller 70 measure the concentration(s) of one or more selected constituents of the tail gas and feed gas, compare the concentrations to preselected values and generate signals that are inputs for multiplying relays 72 and 76. Multiplying relays 72 and 76 correct or adjust the signal generated by flow transmitter 12. Thus, the apparent oxygen demand of the sulfur recovery unit is adjusted to compensate for variations or excursions in the compositions of the feed gas and/or tail gas.

In order to prevent acid gas, combustion products, sulfur and other undesirable materials from entering the oxygen system, an air or nitrogen purge for the system is provided. When the signal from oxygen flow transmitter 36 indicates low r no flow, summing device 60 generates a set point signal that is transmitted to controller 62 which opens valve 64 to provide air or nitrogen to the oxygen system to insure that minimum desired flow is maintained through the system. The purge flow rate is measured with meter 66 and flow transmitter 68 generates a signal proportional to the purge flow rate. If air is used as the purge medium, the signal from transmitter 68 is input into summing device 78 along with the signal from the combustion air flow transmitter 26. The output from the summing device is then input into ratio controller 18 thereby compensating for the addition of the purge air to the system with convention feedback control. The output of the summing device 78 is also input into subtracting relay 14 for control of the oxygen injection system as described above. Air is the preferred purge medium, however nitrogen may be used, in which case summing device 78 is not required.

Figure 4:
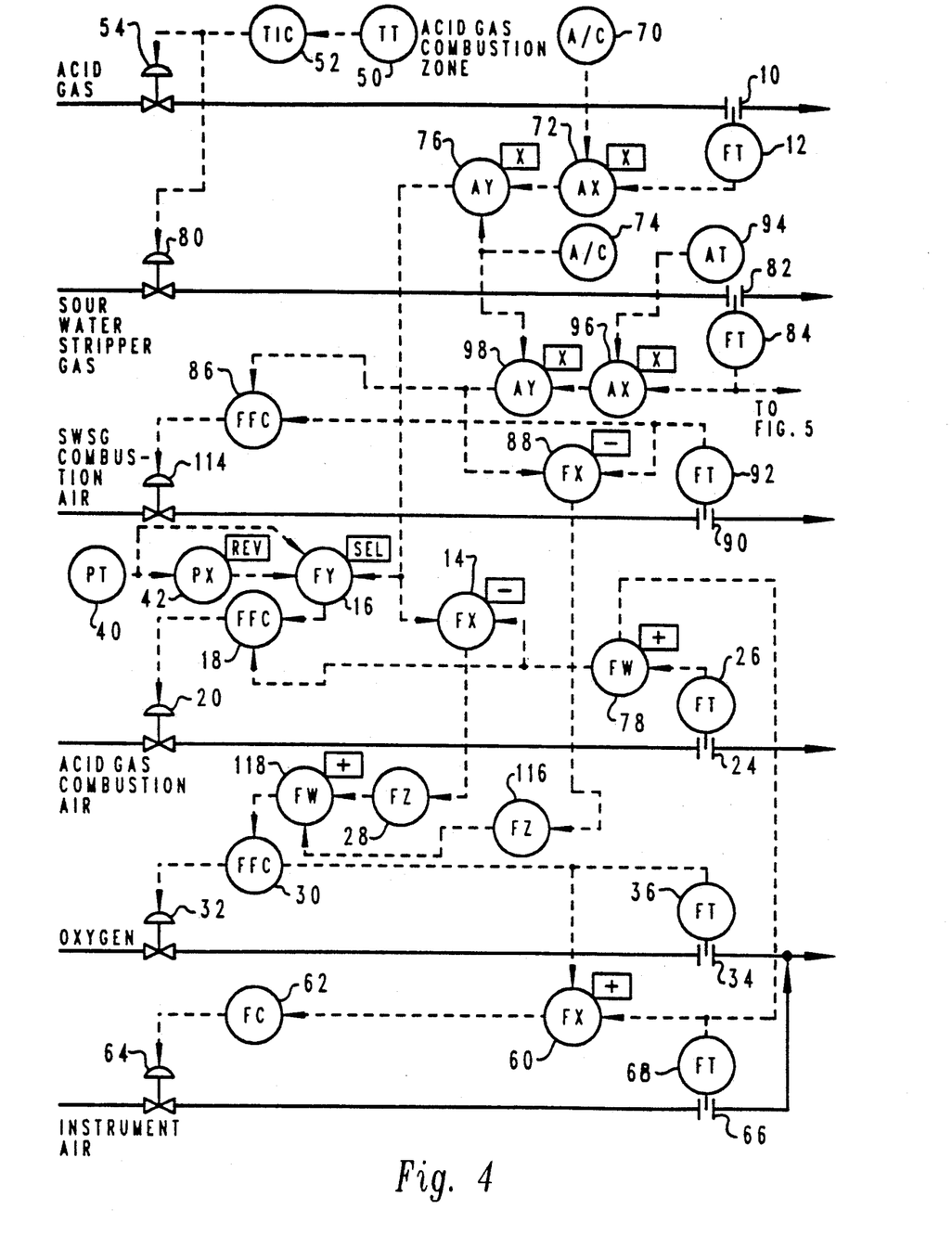
FIGS. 4 and 5 illustrate an embodiment of the present invention wherein a second feed stream, such as a sour water stripper gas is input to the sulfur recovery unit for processing.
Figure 5:
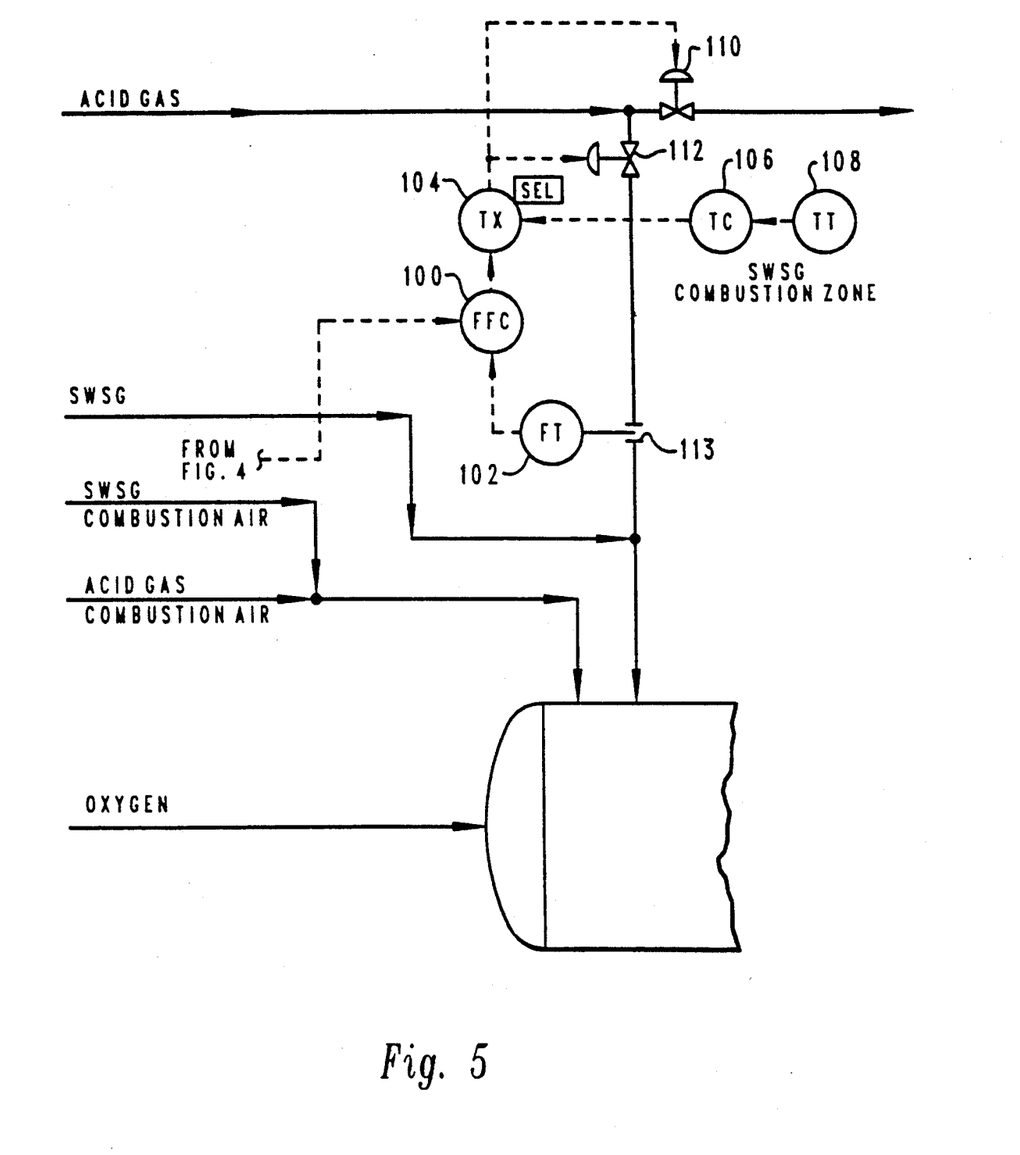

FIGS. 4 and 5 illustrate an embodiment of the invention adapted to a sulfur recovery unit that processes both an amine acid gas and sour water stripper gas. Sour water stripper gas is typically generated during the processing of crude oils that contain chemically bound nitrogen and sulfur. Amine acid gas refers to an acid gas stream generated by absorption and deabsorption of hydrogen sulfide with an amine-based absorbent. In typical refining operations the nitrogen in crude oil is removed as ammonia and sulfur is removed in the form of hydrogen sulfide. Ammonia and hydrogen sulfide are removed from gaseous and liquid products of these operations by water washing or water condensation to produce an aqueous solution known as a sour water.

Treatment of sour water generates a sour water stripper gas that typically contain a substantial, for example more than 10 mole %, amount of ammonia in addition to hydrogen sulfide. Processing sour water stripper gas or a similar gas stream in a Claus-type sulfur recovery unit can, however, cause severe operational problems due to the ammonia contained in the gas. Ammonia, under the conditions present in a sulfur recovery unit, has a tendency to react with sulfur and sulfur containing compounds to produce salts such as ammonia sulfides and sulfates. These salts can precipitate out of the gas stream at the operating temperatures present in a Claus-type sulfur recovery unit, contaminating the system components and blocking tubes and lines in the unit. Moreover, as described above, in the normal operation of a Claus-type sulfur recover unit, only enough oxygen is supplied to combust approximately one-third of the hydrogen sulfide in the feed gas stream along with residual hydrocarbons. This results in a reducing atmosphere which is inappropriate for oxidizing ammonia to elemental nitrogen.

The problems associated with processing sour water stripper gas in a Claus type sulfur recovery unit may be alleviated through the use of multiple combustion zones which allows the sour water stripper gas to be combusted independently of the amine acid gas stream. The gases generated by combusting the sour water stripper gas are input to a second combustion zone. The amine acid gas is combusted in the second combustion zone to the extent necessary to provide sulfur dioxide in an amount such that the ratio of hydrogen sulfide to sulfur dioxide in the gas stream exiting the second combustion zone approximates the stoichiometric ratio of two moles of hydrogen sulfide per mole of sulfur dioxide.

As illustrated in FIGS. 4 and 5, a sour water stripper gas (SWSG) stream enters the sulfur recovery unit through valve 80; the flow rate of the SWSG is measured with meter 82 and a signal proportional to the flow rate is transmitted to controllers 86 and 100 via flow transmitter 84. The signal from flow transmitter 84 becomes the SWSG oxygen required set point and flow controller 86 operates control valve 114 to supply combustion air to a first combustion chamber where the SWSG stream is oxidized to form a combustion product consisting primarily of nitrogen, water vapor and sulfur dioxide. Depending on the particular application, it may be desirable to correct or adjust the signal from flow transmitter 84 to compensate for variations in the SWSG or the tail gas exiting the unit. As illustrated a tail gas analyzer controller 74 sends a signal to multiplying relays 76 and 98 for adjustment of the signals generated by flow transmitters 12 and 84. A SWSG analyzer controller 94 also measures the concentrations of one or more components of the SWSG, compares the concentration(s) to preselected value(s) and transmits a signal to multiplying relay 96 which adjusts the signal generated by flow transmitter 84 to compensate for variations in the composition of the SWSG stream.

The signal from flow transmitter 84 is also transmitted to an SWSG subtracting relay 88 which produces an output signal proportional to the difference between the oxygen required and the oxygen supplied in the form of combustion air which is transmitted to an inverse derivative dampening device 116 which dampens variations due to "noise" in the control system. Dampening device 116 generates an output signal which is transmitted to summing device 118. Summing device 118 adds the oxygen required signals generated by the amine acid gas subtracting relay 14 and the SWSG subtracting relay 88 to generate a signal proportional to the difference between the total oxygen required and the oxygen supplied in the form of combustion air which becomes the set point for ratio controller 30. Ratio controller 30 drives control valve 32 to supply oxygen on an as needed basis to the process. Oxygen flow to the process is measured with flow meter 34 and a flow transmitter 36 transmits the oxygen flow rate to ratio controller 30 for conventional feedback control.

In order to insure that the ammonia in the SWSG stream is completely oxidized to elemental nitrogen, it is important to maintain the temperature of the first combustion zone at or above approximately 2100° F. Depending on the composition of the SWSG stream, it may be desirable to add acid ga to the SWSG prior to combustion to aid in temperature control. As illustrated in FIG. 5, the signal from flow transmitter 84 is input to a ratio controller 100 which drives control valves 110 and 112 to divert a portion of the acid gas steam which is mixed with the SWSG stream. Flow meter 113 measures the flow of the diverted acid gas and flow transmitter 102 generates a proportional signal which is input to ratio controller 100 for conventional feedback control.

In addition to maintaining the desired temperature in order to completely oxidize the ammonia present in the SWSG stream, it is also desirable to avoid thermal excursions above a preselected maximum temperature in the first combustion chamber which could damage process equipment. As illustrated, a temperature control system includes a measuring device such as a thermocouple or pyrometer (not shown) that senses the temperature in the first combustion zone and temperature transmitter 108 that generates a signal which is input to a selector relay 104. In the event that the temperature in the first combustion zone exceeds a preselected value, selector relay 104 switches to a temperature control mode, closing control valve 112 and opening control valve 110 to decrease or stop the addition of acid gas to the SWSG stream. Alternatively, the temperature control system could be used to regulate minimum temperature or a differential gap controller could be employed to control both maximum and minimum temperatures in the combustion chamber.

Figure 6:
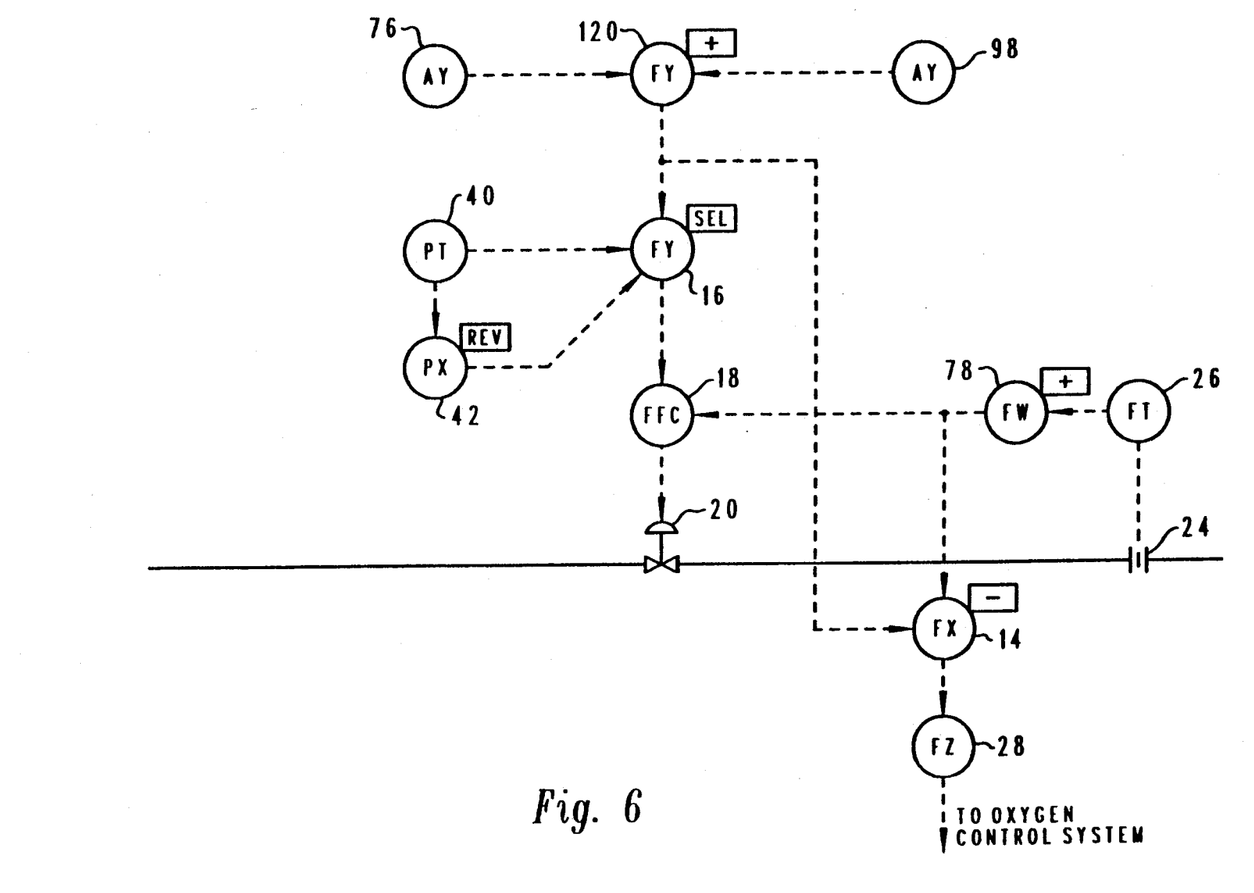
FIG. 6 illustrates an alternate embodiment of the control system of FIGS. 4 and 5.

Referring now to FIG. 6, an alternate embodiment of a portion of control system of FIGS. 4 and 5 employing a single combustion air stream is illustrated. In the embodiment illustrated in FIG. 6, the output signals from multiplying relays 76 and 98 are input to summing device 200. If an air purge is employed, summing device 78 is provided in accordance with the description of the embodiment of FIG. 3. Summing device 120 generates a signal proportional to the total oxygen required based on the acid gas flow, the SWSG flow and adjustments and corrections due to variations in feed and tail gas compositions. The signal from summing device 120 is input to subtracting relay 14 and selector relay 16. The output from selector relay 16 becomes the set point for ratio controller 18 which drives control valve 20, supplying combustion air to the process. The flow of combustion air is measured with flow meter 24 and a signal proportional to the air flow rate is transmitted to ratio controller 18 and subtracting relay 14 by flow transmitter 26. The subtracting relay 14 produces an output signal proportional to the difference between the oxygen required and the oxygen supplied in the form of combustion air which is transmitted to an inverse derivative dampening device 28 which dampens variations due to "noise" in the control system. Dampening device 28 generates an output signal which becomes the set point for ratio controller 30 of FIG. 5 to supply supplemental oxygen to the system on an as needed basis.

The system pressure and hydraulic loading is controlled in a manner similar to that described in connection with the embodiment of FIG. 1. System pressure is measured at an appropriate location and a pressure transmitter 40 generates an output signal which is transmitted to selector relay 16 and a signal reversing device 42. When the system pressure exceeds a predetermined level, selector relay 16 switches the set point signal from the oxygen required signal generated by summing device 120 to an inverted pressure signal generated by signal reversing device 42. As the system pressure increases, the inverted pressure signal from signal reversing device 42 decreases, lowering the set point of ratio controller 18 which, in turn, tends to drive control valve 20 closed to decrease the amount of combustion air supplied to the system. The resulting decrease in combustion air flow creates a differential between the oxygen supplied and the oxygen required causing subtracting relay 14 to generate a positive signal, activating the oxygen control system to inject supplemental oxygen into the system as needed. When the system pressure drops below a predetermined level, selector relay 16 switches the set point from the inverted pressure signal generated by signal reversing device 42 to the oxygen required signal generated by summing device 120. Assuming that there is no differential between oxygen required and oxygen supplied, the output of subtracting relay 14 will drop to zero and the flow of supplemental oxygen to the system will cease.

It will be understood and appreciated by those skilled in the art that the discrete devices disclosed in the drawings may be functional elements of common devices or of a microprocessor or other computer based control system, all of which are within the scope of the present invention.

While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention.

We claim:

1. A process for controlling the hydraulic loading of a sulfur recovering unit of the type having a fixed hydraulic capacity wherein an acid gas containing hydrogen sulfide is partially oxidized to produce elemental sulfur by the Claus process and wherein a tail gas containing hydrogen sulfide and sulfur dioxide exits the sulfur recovery unit, the process comprising:

measuring an acid gas flow to a sulfur recovery unit to determine an oxygen requirement based on the acid gas flow;

generating a first signal proportional to an oxygen requirement based on the acid gas flow to the sulfur recovery unit;

measuring combustion air flow to the sulfur recovery unit;

generating a second signal proportional to an oxygen flow to the sulfur recovery unit based on the combustion air flow to the sulfur recovery unit;

comparing the first and second signals and generating a third signal proportional to a difference between the oxygen requirement and oxygen supplied;

activating an oxygen injection system to provide a supplemental feed stream consisting essentially of oxygen to the sulfur recovery unit in an amount proportional to the third signal;

measuring a unit pressure in the sulfur recovery unit;

comparing the unit pressure to the hydraulic capacity of the sulfur recovery unit; and reducing the flow of combustion air to the sulfur recovery unit when the unit pressure exceeds the hydraulic capacity to maintain the unit pressure at the hydraulic capacity of the sulfur recovery unit.

2. The process of claim 1 further comprising the steps of:

measuring a second gaseous feed stream flow, the second gaseous feed stream containing hydrogen sulfide and greater than 10 mole percent ammonia to the sulfur recovery unit;

determining an oxygen requirement based on the flow of second gaseous feed stream to the sulfur recovery unit;

determining the sum of the oxygen requirement based on the acid gas flow and the oxygen requirement based on the second gaseous feed stream flow; and generating a first signal proportional to the sum of the oxygen requirement based on the acid gas flow to the sulfur recovery unit and the oxygen requirement based on the flow of the second gaseous feed stream.

3. The process of claim 2 further comprising the step of:

mixing an acid gas feed stream with the second gaseous feed stream based on the flow of the second gaseous feed stream.

4. The process of claim 1 further comprising the steps of:

sampling a tail gas stream exiting the sulfur recovery unit, the tail gas stream having a concentration of hydrogen sulfide and a concentration of sulfur dioxide;

determining the concentration of hydrogen sulfide in the tail gas stream;

determining the concentration of sulfur dioxide in the tail gas stream;

determining the difference between the concentration of hydrogen sulfide and the concentration of sulfur dioxide in the tail gas stream; and adjusting the first signal based upon the difference between the concentration of hydrogen sulfide and the concentration of sulfur dioxide in the tail gas stream.

5. The process of claim 1 further comprising the steps of:

sampling an acid gas feed to the sulfur recovery unit, said acid gas having a concentration of hydrogen sulfide;

measuring the concentration of hydrogen sulfide in the acid gas feed; and adjusting the first signal based upon the concentration of hydrogen sulfide in the acid gas feed.

6. The process of claim 1 further comprising the steps of:

measuring an oxygen containing purge gas flow; and adjusting the first signal based on the oxygen containing purge gas flow.

7. A process for controlling the hydraulic loading of a sulfur recovery unit of the type having a fixed hydraulic capacity wherein an acid gas containing hydrogen sulfide is partially oxidized to produce elemental sulfur by the Claus process and wherein a tail gas containing hydrogen sulfide and sulfur dioxide exits the sulfur recovery unit, the process comprising:

measuring an acid gas flow to a sulfur recovery unit to determine an oxygen requirement based on the acid gas flow;

measuring a second gaseous feed stream flow to determine an oxygen requirement based on the flow of the second gaseous feed stream, the second gaseous feed stream containing hydrogen sulfide and greater than 5 mole percent ammonia to the sulfur recovery unit;

determining the sum of the oxygen requirement based on the acid gas flow and the oxygen requirement based on the second gaseous feed stream flow;

generating a first signal proportional to the sum of the oxygen requirement based on the acid gas flow to the sulfur recovery unit and the oxygen requirement based on the flow of the second gaseous feed stream;

measuring combustion air flow to the sulfur recovery unit;

generating a second signal proportional to an oxygen flow to the sulfur recovery unit based on the combustion air flow to the sulfur recovery unit;

comparing the first and second signals and generating a third signal proportional to a difference between the oxygen requirement and oxygen supplied;

activating an oxygen injection system to provide a supplemental feed stream consisting essentially of oxygen to the sulfur recovery unit in an amount proportional to the third signal;

measuring a unit pressure in the sulfur recovery unit;

comparing the unit pressure to the hydraulic capacity of the sulfur recovery unit; and reducing the flow of combustion air to the sulfur recovery unit when the unit pressure exceeds the hydraulic capacity to maintain the unit pressure at the hydraulic capacity of the sulfur recovery unit.

8. The process of claim 7 further comprising the step of:

mixing an acid gas feed stream with the second gaseous feed stream based on the flow of the second gaseous feed stream.

9. The process of claim 7 further comprising the steps of:

sampling a tail gas stream exiting the sulfur recovery unit, the tail gas stream having a concentration of hydrogen sulfide and a concentration of sulfur dioxide;

determining the concentration of hydrogen sulfide in the tail gas stream;

determining the concentration of sulfur dioxide in the tail gas stream;

determining the difference between the concentration of hydrogen sulfide and the concentration of sulfur dioxide in the tail gas stream; and adjusting the first signal based upon the difference between the concentration of hydrogen sulfide and the concentration of sulfur dioxide in the tail gas stream.

10. The process of claim 7 further comprising the steps of:

sampling an acid gas feed to the sulfur recovery unit, said acid gas having a concentration of hydrogen sulfide;

measuring the concentration of hydrogen sulfide in the acid gas feed; and adjusting the first signal based upon the concentration of hydrogen sulfide in the acid gas feed.

11. The process of claim 7 further comprising the steps of:

measuring an oxygen containing purge gas flow; and adjusting the first signal based on the oxygen containing purge gas flow.

12. Apparatus for controlling oxygen flow to a sulfur recovery unit of the type having a fixed hydraulic capacity wherein an acid gas containing hydrogen sulfide is partially oxidized to produce elemental sulfur by the Claus process and wherein a tail gas containing hydrogen sulfide and sulfur dioxide exits the sulfur recovery unit comprising:

means for measuring an acid gas flow to a sulfur recovery unit;

means for generating a first signal proportional to an oxygen requirement based on the acid gas flow to the sulfur recovery unit;

means for measuring combustion air flow to the sulfur recovery unit;

means for generating a second signal proportional to an oxygen flow to the sulfur recovery unit based on the combustion air flow to the sulfur recovery unit;

means for comparing the first and second signals and generating a third signal proportional to a difference between the oxygen requirement and oxygen supplied;

control means responsive to the third signal for activating an oxygen injection system to provide a supplemental feed stream consisting essentially of oxygen to the sulfur recovery unit in an amount proportional to the third signal;

means for measuring a unit pressure in the sulfur recovery unit;

means for comparing the unit pressure to the hydraulic capacity of the sulfur recovery unit and generating a fourth signal proportional to a difference between the unit pressure and the system hydraulic pressure; and control means responsive to the fourth signal for reducing the flow of combustion air to the sulfur recovery unit when the unit pressure exceeds the hydraulic capacity to maintain the unit pressure at the hydraulic capacity of the sulfur recovery unit.

13. The apparatus of claim 12 further comprising:

means for measuring a second gaseous feed stream flow, the second gaseous feed stream containing hydrogen sulfide and greater than 10 mole percent ammonia to the sulfur recovery unit;

means for determining an oxygen requirement equivalent to the flow of the second gaseous feed stream;

means for determining the sum of the oxygen requirement based on the acid gas flow and the oxygen requirement based on the second gaseous feed stream flow; and means for generating a first signal proportional to the sum of the oxygen requirement based on the acid gas flow to the sulfur recovery unit and the oxygen requirement based on the flow of the second gaseous feed stream.

14. The apparatus of claim 13 further comprising:

means for mixing an acid gas feed stream with the second gaseous feed stream based on the flow of the second gaseous feed stream.

15. The apparatus of claim 12 further comprising:

means for sampling a tail gas stream exiting the sulfur recovery unit, the tail gas stream having a concentration of hydrogen sulfide and a concentration of sulfur dioxide;

means for determining the concentration of hydrogen sulfide in the tail gas stream;

means for determining the concentration of sulfur dioxide in the tail gas stream;

means for determining the difference between the concentration of hydrogen sulfide and the concentration of sulfur dioxide in the tail gas stream; and means for adjusting the first signal based upon the difference between the concentration of hydrogen sulfide and the concentration of sulfur dioxide in the tail gas stream.

16. The apparatus of claim 12 further comprising:

means for sampling an acid gas feed to the sulfur recovery unit, said acid gas having a concentration of hydrogen sulfide;

means for measuring the concentration of hydrogen sulfide in the acid gas feed; and means for adjusting the first signal based upon the concentration of hydrogen sulfide in the acid gas feed.

17. The apparatus of claim 12 further comprising:

means for measuring an oxygen containing purge gas flow; and means for adjusting the first signal based on the oxygen containing purge gas flow.

18. Apparatus for controlling oxygen flow to a sulfur recovery unit of the type having a fixed hydraulic capacity wherein an acid gas containing hydrogen sulfide is partially oxidized to produce elemental sulfur by the Claus process and wherein a tail gas containing hydrogen sulfide and sulfur dioxide exits the sulfur recovery unit comprising:

means for measuring an acid gas flow to a sulfur recovery unit;

means for measuring a second gaseous feed stream flow, the second gaseous feed stream containing hydrogen sulfide and greater than 10 mole percent ammonia to the sulfur recovery unit;

means for determining an oxygen requirement based on the second gaseous feed stream flow;

means for determining the sum of the oxygen requirement based on the acid gas flow and the oxygen requirement based on the second gaseous feed stream flow;

means for generating a first signal proportional to the sum of the oxygen requirement based on the acid gas flow to the sulfur recovery unit and the oxygen requirement based on the flow of the second gaseous feed stream;

means for measuring combustion air flow to the sulfur recovery unit;

means for generating a second signal proportional to an oxygen flow to the sulfur recovery unit based on the combustion air flow to the sulfur recovery unit;

means for comparing the first and second signals and generating a third signal proportional to a difference between the oxygen requirement and oxygen supplied;

control means responsive to the third signal for activating an oxygen injection system to provide a supplemental feed stream consisting essentially of oxygen to the sulfur recovery unit in an amount proportional to the third signal;

means for measuring a unit pressure in the sulfur recovery unit;

means for comparing the unit pressure to the hydraulic capacity of the sulfur recovery unit and generating a fourth signal proportional to a difference between the unit pressure and the system hydraulic pressure; and control means responsive to the fourth signal for reducing the flow of combustion air to the sulfur recovery unit when the unit pressure exceeds the hydraulic capacity of the sulfur recovery unit.

19. The apparatus of claim 18 further comprising:

means for mixing an acid gas feed stream with the second gaseous feed stream based on the flow of the second gaseous feed stream.

20. The apparatus of claim 18 further comprising:

means for sampling a tail gas stream exiting the sulfur recovery unit, the tail gas stream having a concentration of hydrogen sulfide and a concentration of sulfur dioxide;

means for determining the concentration of hydrogen sulfide in the tail gas stream;

means for determining the concentration of sulfur dioxide in the tail gas stream;

means for determining the difference between the concentration of hydrogen sulfide and the concentration of sulfur dioxide in the tail gas stream; and means for adjusting the first signal based upon the difference between the concentration of hydrogen sulfide and the concentration of sulfur dioxide in the tail gas stream.

21. The apparatus of claim 18 further comprising:

means for sampling an acid gas feed to the sulfur recovery unit, said acid gas having a concentration of hydrogen sulfide;

means for measuring the concentration of hydrogen sulfide in the acid gas feed; and means for adjusting the first signal based upon the concentration of hydrogen sulfide in the acid gas feed.

22. The apparatus of claim 8 further comprising:

means for measuring an oxygen containing purge gas flow; and means for adjusting the first signal based on the oxygen containing purge gas flow.

* * * * *

UNITED STATES PATENT AND TRADEMARK OFFICE
CERTIFICATE OF CORRECTION

PATENT NO. : 5,266,274
DATED : November 30, 1993
INVENTOR(S) : George W. Taggart, et. al.

It is certified that error appears in the above-indentified patent and that said Letters Patent is hereby corrected as shown below:

Title page, item [75], inventor: after "George W. Taggart, Dallas; James E. Lewis, Plano, both of Texas" should be --George W. Taggart, Dallas; James E. Lewis, Plano; James L. Hampsten, Rockwall, all of Texas--.

Column 1, line 37, "2HS+3O$_2$" should be --2H$_2$S+3O$_2$--

Column 5, line 54, "r no" should be --or no--

Column 7, line 33, "acid ga" should be --acid gas--

Column 2, line 31, "feedstream" should be --feed stream--

Column 2, line 33, "feedstream" should be --feed stream--

Column 3, line 27, "processing." should be --processing; and--

Signed and Sealed this

Twenty-first Day of November, 1995

Attest:

BRUCE LEHMAN

Attesting Officer    Commissioner of Patents and Trademarks